US012657198B2

(12) United States Patent
Sokolov et al.

(10) Patent No.: US 12,657,198 B2
(45) Date of Patent: *Jun. 16, 2026

(54) SYSTEMS AND METHODS FOR WRITING FEEDBACK USING AN ARTIFICIAL INTELLIGENCE ENGINE

(71) Applicant: Microsoft Technology Licensing, LLC, Redmond, WA (US)

(72) Inventors: Aleksey Aleksandrovich Sokolov, Snoqualmie, WA (US); Utkarsh Garg, Bellevue, WA (US); Siqing Chen, Bellevue, WA (US); Warren Anthony Aldred, Redmond, WA (US); Saket Kumar, Buckley, WA (US); Cheng Yang, Chengdu (CN); Bhavuk Jain, Redmond, WA (US); Mahaveer Bhavarlal Kothari, Redmond, WA (US); Alyssa Rachel Mayo, New Rochelle, NY (US); Tashfeen Ahmed, Dublin (IE); Zhang Li, Seattle, WA (US); Olivier Michel Nicolas Gauthier, Duvall, WA (US); Christine Lauren Mayer, Seattle, WA (US); Jesse Alexander Freitas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/002,917

(22) Filed: Dec. 27, 2024

(65) Prior Publication Data

US 2025/0181597 A1 Jun. 5, 2025

Related U.S. Application Data

(63) Continuation of application No. 18/178,653, filed on Mar. 6, 2023, now Pat. No. 12,216,674.

(51) Int. Cl.
*G06F 7/00* (2006.01)
*G06F 16/245* (2019.01)
(Continued)

(52) U.S. Cl.
CPC .......... *G06F 16/248* (2019.01); *G06F 16/245* (2019.01); *G06N 20/00* (2019.01)

(58) Field of Classification Search
CPC .... G06F 16/243; G06F 16/244; G06F 16/245; G06F 16/248; G06F 16/285;
(Continued)

(56) References Cited

U.S. PATENT DOCUMENTS

| 12,216,674 B2 * | 2/2025 | Sokolov | G06F 40/216 |
| 2014/0032471 A1 * | 1/2014 | Reddy | G10L 15/22 |
| | | | 706/47 |

(Continued)

OTHER PUBLICATIONS

International Preliminary Report on Patentability (Chapter I) received for PCT Application No. PCT/US2024/017784, Sep. 18, 2025 07 pages.

*Primary Examiner* — Mohammad A Sana
(74) *Attorney, Agent, or Firm* — NovoTechIP International PLLC

(57) ABSTRACT

A data processing system includes: a processor; a memory containing programming instructions for execution by the processor; and a network interface for communicating with an Artificial Intelligence (AI) engine. The programming instructions include an application for generating written content, the application having a function to generate and submit a structured query regarding the written content to the AI engine to generate feedback on an assessed quality of the written content, the structured query structured to prompt for feedback in a variety of specified categories for the written content. The application further includes a user (Continued)

interface to display the feedback on the written content and provide an option to a user to implement the feedback to revise the written content.

21 Claims, 12 Drawing Sheets

(51) Int. Cl.
    *G06F 16/248*         (2019.01)
    *G06N 20/00*         (2019.01)
(58) Field of Classification Search
    CPC ............. G06F 16/9535; G06F 16/3329; G06F 16/90332; G06F 16/90335; G06F 16/217; G06F 16/2455; G06F 16/353; G06F 40/247; G06F 40/216; G06F 40/288; G06F 40/289; G06F 40/295; G06F 40/242; G06F 40/40; G06N 5/04; G06N 5/01; G06N 20/00; G06N 20/20; G06Q 10/10
    See application file for complete search history.

(56)                References Cited

U.S. PATENT DOCUMENTS

| | | | |
|---|---|---|---|
| 2017/0147945 A1* | 5/2017 | Henderson | G06Q 10/067 |
| 2017/0357910 A1* | 12/2017 | Sommer | G06F 9/54 |
| 2018/0174019 A1* | 6/2018 | Henderson | G06N 5/02 |
| 2022/0051098 A1* | 2/2022 | McCarthy | G06F 3/167 |
| 2023/0072925 A1* | 3/2023 | Ross | G06N 20/10 |

* cited by examiner

150

AI writing feedback feature invoked
151

User identifies all or portion of written text for review
152

Structure query for AI engine using designated written text
153

Obtain AI feedback
154

Output AI writing feedback with options to implement proposed changes for user
155

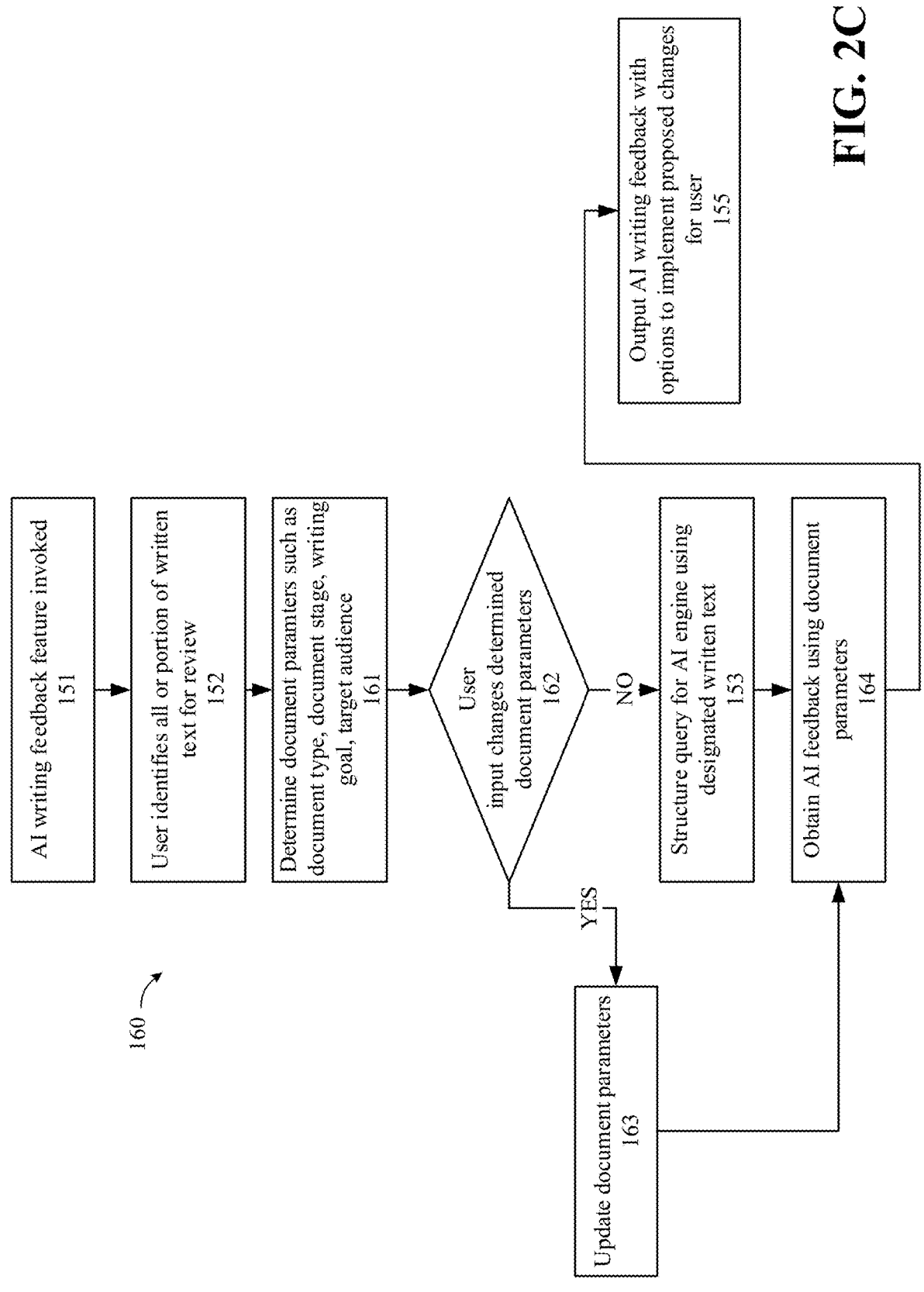

AI writing feedback feature invoked 151

User identifies all or portion of written text for review 152

Determine document parameters such as document type, document stage, writing goal, target audience 161

User input changes determined document parameters 162

YES

Update document parameters 163

NO

Structure query for AI engine using designated written text 153

Obtain AI feedback using document parameters 164

Output AI writing feedback with options to implement proposed changes for user 155

SYSTEMS AND METHODS FOR WRITING FEEDBACK USING AN ARTIFICIAL INTELLIGENCE ENGINE

CROSS-REFERENCE TO RELATED APPLICATION

This application claims the benefit of priority from pending U.S. patent application Ser. No. 18/178,653, filed on Mar. 6, 2023, and entitled "SYSTEMS AND METHODS FOR WRITING FEEDBACK USING AN ARTIFICIAL INTELLIGENCE ENGINE". The entire contents of the above-referenced application is incorporated herein by reference.

BACKGROUND

Effective communication is a critical component of success in any cooperative organization, effort or enterprise. Within the realm of communication, written communication is often needed or preferred in situations when verbal communication may be less efficient or convenient. However, effective written communication can be a challenge. The aptitude for producing effective writing can vary dramatically between different people. Additionally, some writers may need to communicate in a written language that is not their native language. Such writers may not be aware of accepted conventions in the language in which they are writing and, therefore, may not be able to identify errors.

Consequently, feedback is a very useful component in the writing process. Even professional writers may utilize feedback on their writing, especially in academic and professional contexts where evaluation and review of a written work may involve a number of people to arrive at an optimal final product. For example, scholars commonly use peer review. Working professionals in many workplaces will seek the input of at least one colleague or a supervisor before finalizing a written communication.

Constructive writing feedback can thus help a writer determine what areas in their writing need more focus or practice. Such feedback can provide helpful insight, validation, a fresh perspective, and boost motivation. However, asking another person for feedback on a written draft is time-consuming for both parties and may leave the writer dependent on receiving an astute review in order to produce a good written communication.

Hence, there is a need for improved systems and methods of providing readily available, rapid and high-quality feedback on a written document.

SUMMARY

In one general aspect, the instant disclosure presents a data processing system that includes: a processor; a memory containing programming instructions for execution by the processor; and a network interface for communicating with an Artificial Intelligence (AI) engine. The programming instructions include an application for generating written content, the application having a function to generate and submit a structured query regarding the written content to the AI engine to generate feedback on an assessed quality of the written content, the structured query structured to prompt for feedback in a variety of specified categories for the written content. The application further includes a user interface to display the feedback on the written content and provide an option to a user to implement the feedback to revise the written content.

In another aspect, the instant disclosure describes a non-transitory computer-readable medium comprising programming instructions that, when executed by a processor, cause the processor to: generate a structured query for an Artificial Intelligence (AI) engine regarding designated written content, the structured query to the AI engine to generate feedback on an assessed quality of the written content; submit the query to the AI engine via a network interface; receive the feedback on the written content from the AI engine via the network interface; and invoke a user interface to display the feedback on the written content and provide an option to a user to implement the feedback to revise the written content.

In another aspect, the instant disclosure describes a computer-implemented method of providing technical writing assistance to a user operating an application to generate written content by providing feedback on the written content from an Artificial Intelligence (AI) engine. The method includes: generating a structured query for the AI engine regarding the written content, the structured query to the AI engine to generate feedback on an assessed quality of the written content; submitting the query to the AI engine via a network interface; receiving the feedback on the written content from the AI engine via the network interface; and invoking a user interface to display the feedback on the written content and provide an option to a user to implement the feedback to revise the written content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2C is a flow diagram illustrating a method of obtaining writing feedback according to aspects of this disclosure.

DETAILED DESCRIPTION

Figure 1A:
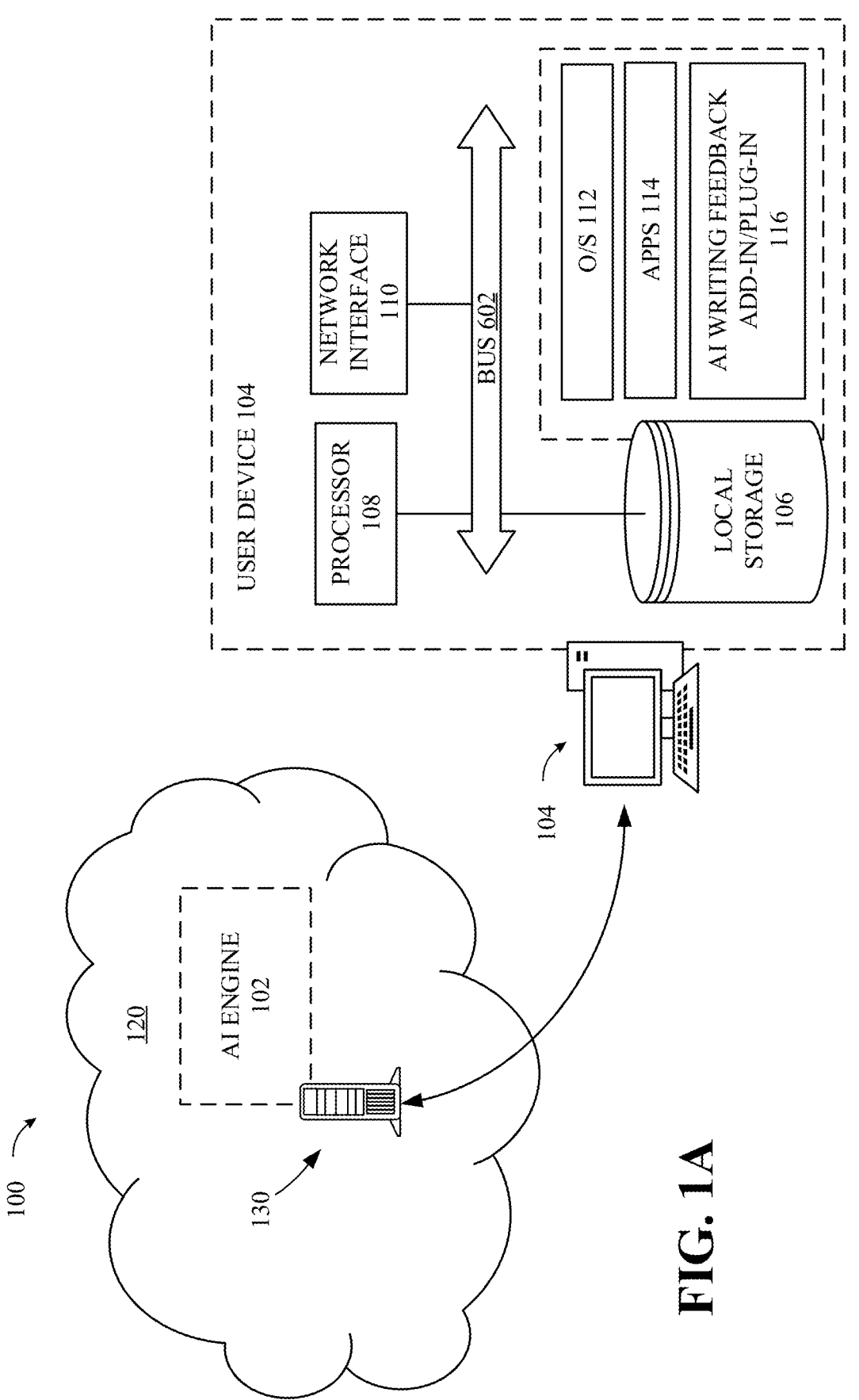
FIG. 1A depicts an example system upon which aspects of this disclosure may be implemented.

As noted above, constructive writing feedback can be important in producing an effective written communication and in helping a writer determine what areas in their writing need more focus or practice. Such feedback can provide helpful insight, validation, a fresh perspective, and boost motivation. However, asking another person for feedback on a written draft is time-consuming for both parties and may leave the writer dependent on finding good reviewer in order to produce a good written communication. Hence, there is a need for improved systems and methods of providing readily available, rapid and high-quality feedback on a written document.

The majority of written communication now takes place electronically through user devices that communicate via a computer network. Consequently, producing good written communication is a technical problem that may be addressed, at least in part, by technical solutions. For example, word processing and other applications with which a user produces a written communication commonly include features that point out to the user the misspelling of a word or a grammatical error. While such technical solutions may be far short of the feedback that would be provided by a human colleague, such functions can improve the quality of a written communication.

As part of the continuing effort to provide users with additional technical solutions to the problem of weak writing ability, this specification describes and explains the application of artificial intelligence (AI) as a technical solution to provide users with feedback on their writing and an improved writing experience. Such feedback can be rapidly produced without requiring the time and attention of another person and can be very high quality, including assisting a user who is writing in a non-native language.

As described herein, this AI writing feedback feature is designed to help users improve their writing by offering accurate, timely and personalized feedback suggestions. The AI writing feedback feature also provides rhetorical analysis, including where a document can be more persuasive and effective, points out areas of confusion, and provides content suggestions.

More specifically, the described AI writing feedback feature can automatically process and analyze written content and then provide detailed writing feedback tailored to the user's intended meaning. Advancing well beyond existing writing assistance software that offers grammar, spelling, punctuation and syntax correction, the AI writing feedback feature being described has a deeper understanding of the meaning and semantics of the input document including its type, document stage, likely target audience and writing goal. The feature provides intelligent and high-quality document level feedback by highlighting problematic examples in the user's document and offering a relevant technical or stylistic rewrite suggestion with which to replace the flagged section. The AI writing feedback feature is, thus, a general technical solution not limited by specific handcrafted domains and topics. The feature can address a wide range of issues like tone, structure, flow, clarity, evidence, word choice, style, rhythm, and others for any type of writing. Today, only human experts can provide similar quality feedback.

This feedback may be presented in an editorial pane of the user interface in which the user is writing. Specifically, the AI writing feedback feature may be incorporated into an application that provides tools for drafting text or may be incorporated into a plug-in or add-in for such an application. For example, the application may be, but is not limited to, a browser, a word processor, a spreadsheet, an email application, collaboration or presentation applications or any other application with which a user may be generating written content.

FIG. 1A depicts an example system 100 upon which aspects of this disclosure may be implemented. As shown in FIG. 1A, a user device could be a personal computer of any type, a workstation or other computing device with a network interface 110 for communicating data via a network or cloud 120. As will be described, a user will operate the user device 104 to generate written communications that can be reviewed by the AI engine 102.

As shown in FIG. 1A, the user device 104 may include a processor 108 and a local data storage 106. The processor 108 may be or include any number of processors 610 or processing cores working in tandem. The local data storage 106 may be or include a hard drive, solid-state drive, flash memory, Random Access Memory (RAM), a disc array or any other form of electronic data storage. The processor 108 and local storage 106 are connected via a data bus 602. The bus 602 also provides communication for the processor 108 with the network interface 110. Through this network interface 110, the user device 104 can communicate with other devices via the network or cloud 120.

The local storage 106 will contain different types of programming instructions, applications, programs, software, firmware and data files. As shown in FIG. 1A, the local storage 106 will also store an operating system (O/S) 112 for execution by the processor 108. Although not specifically illustrated, this will include a Basic Input Output System (BIOS), drivers and firmware needed to operate the user device 104.

A number of applications or programs 114 are also contained in the local storage 106. Applications 114 are executed on the O/S after the O/S is executing. Many of the applications 114 will include a user interface with which a user generates written communications. Examples of such applications including word processing applications, browsers, email applications, spreadsheets, presentation or collaboration applications, and many others. The user interfaces of such applications will accept and mirror text that is typed by the user on a keyboard or otherwise input to the user device 104. These user interfaces will also include tools for editing the written text that has been input.

According to the present application, the local storage 106 of the user device 104 will also include an Artificial Intelligence (AI) writing feedback feature. This feature may be a native feature to an application 114, as described above or may be implemented as a plug-in or add-in 116 for one of the applications 114.

A plug-in or add-in is a software component that adds specific functionality to an existing software application. Plug-ins and add-ins are usually created to extend the capabilities of the host application, without requiring users to purchase a new, standalone software program. They can add new features, enhance existing ones, or customize the behavior of the software in some way. In general, plug-ins and add-ins are designed to be easily installed and uninstalled, so users can choose to add or remove specific features based on their needs.

Thus, whether a native component of an application or a plug-in or add-in 116, this programming component will add to a respective application the functionality described herein of being able to provide the user with sophisticated feedback on a written communication or writing sample. For example, the plug-in or add-in 116 can support an application in providing any of the user interface elements illustrated and described in any of FIGS. 2A, 2B, and 3A-C and others.

Figure 1B:
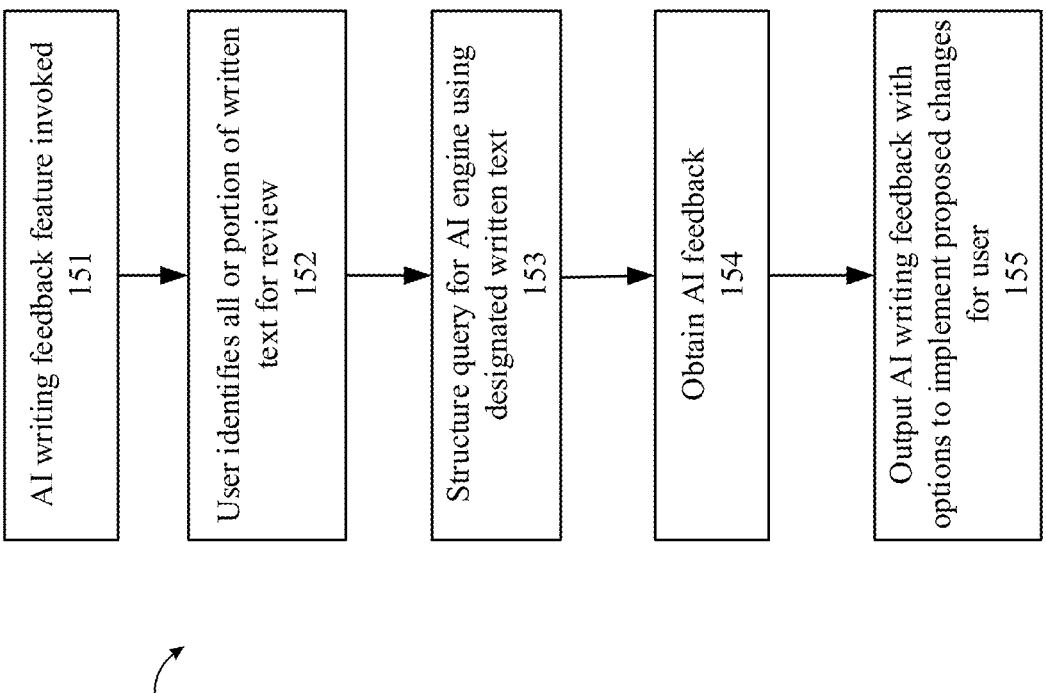
FIG. 1B is a flow diagram illustrating a method of obtaining writing feedback according to aspects of this disclosure.

Additionally, the plug-in or add-in 116 can implement for any respective application the features and flows illustrated in any of FIGS. 1B, 2C and others.

In general terms, the plug-in or add-in 116 will allow the user to request feedback on a writing sample from an AI engine 102. In the example of FIG. 1A, the AI engine 102 is implemented on a server 130 that is accessible to the user device 104 via the network or cloud 120. The AI engine 102 can be any artificial intelligence or Large Language Model (LLM) that is trained to provide feedback on a submitted writing sample when properly queried to do so. In an example, the AI engine 102 may be GPT-3 or ChatGPT.

GPT stands for "Generative Pre-trained Transformer." It is a type of large-scale neural language model developed by OpenAI that uses deep learning techniques to generate natural language text. GPT models are pre-trained on large datasets of text, allowing them to learn patterns and relationships in language and then generate new text based on that learning. GPT models have been trained on a wide range of text, from web pages to books, and can be fine-tuned for specific tasks, such as question answering, summarization, and translation. They have been used in a variety of applications, including chatbots, language translation, and text generation for creative writing and content creation.

GPT-3 is the third generation of the GPT (Generative Pre-trained Transformer) language model developed by OpenAI, which is currently one of the largest and most powerful language models available. It has been pre-trained on a vast amount of text data and can generate high-quality natural language text, including articles, stories, and even computer code. GPT-3 has 175 billion parameters, making it several orders of magnitude larger than its predecessor, GPT-2. ChatGPT, on the other hand, is a variant of GPT that has been specifically fine-tuned for conversational tasks, such as chatbots and dialogue systems. ChatGPT has been trained on a large corpus of conversational data and can generate responses to user input in a way that simulates natural conversation.

The main difference between GPT-3 and ChatGPT is their respective training data and the specific tasks they are designed for. While GPT-3 is a general-purpose language model that can perform a wide variety of language tasks, ChatGPT is focused on conversational applications and has been fine-tuned specifically for that purpose. This means that while GPT-3 may perform well on a variety of language tasks, ChatGPT is likely to perform better on conversational tasks specifically.

Given the differences in training, GPT-3 may be better suited to operate with the plug-in or add-in 116 of FIG. 1A. However, a variety of existing AI engines or LLMs can be employed according to the principles described herein to provide writing feedback.

FIG. 1B is a flow diagram illustrating a method 150 of obtaining writing feedback according to aspects of this disclosure. As shown in FIG. 1B, a user will begin by invoking 151 the AI writing feedback feature that is a native feature of an application or provided to an application by the plug-in or add-in 116. There are several ways the feature may be invoked, which will be described below.

Next, the user will identify 152, in the user interface of the application, what written text is to be reviewed and receive feedback. This may be an entire document or just a portion of the document. For example, feedback could be sought on just the title, a particular paragraph, several paragraphs, a specific section or any other subset of a writing sample or document. In some examples, the system may simply assume that all of the open document is to be reviewed. In other examples, the system will prompt for user input on how much and what portions of the document to review.

Next, the feedback feature will structure 153 a query to the AI engine for feedback on and using the designated written text. This query can be in natural language, given the Natural Language Processing (NLP) capabilities of a GPT or similar AI engine. However, the query is specifically structured in a technical manner to illicit from the AI engine the helpful writing feedback desired by the user.

For example, a query could be structured in the following manner, the query prompts the LLM to critique the input text AND for each critique to provide (1) a title, (2) a description of the critique (2a) respecting a specific tone and (2b) respecting a specific format, (3) an example of the critique in the document and (4) a suggested rewrite, such that the user interface can render the above in a usable format, as will be illustrated below. Again, a query with this structure can be prepared in natural language given the interface of GPT-3 and similar engines.

In another example, the structure for the query could be described as natural language instructions:

delimiting input, instructions and output
    specifying text selection user seeks feedback on if not the whole document
    requesting multiple feedbacks applicable to the whole document to improve the writing, each containing:
    descriptive title
    example from the input supporting the feedback if available
    rewrite suggestion for the example on the basis of feedback if available
    strict output format suitable for parsing containing delimited feedback, title, example and rewrite
    requesting response to be written in applicable tone, i.e. neutral, professional, polite, etc.
    custom prompt from the user asking for specific type of feedback
    removal of trivial or hallucinated feedback on topics like grammar, visuals, structure, format and others Once properly structured, the query is submitted to the AI engine to obtain 154 the AI feedback. Once received from the AI engine, the application, e.g., using the plug-in or add-in 116, will be able to display 155 the feedback and implement the feedback at the user's direction as further described herein.

Figure 2A:
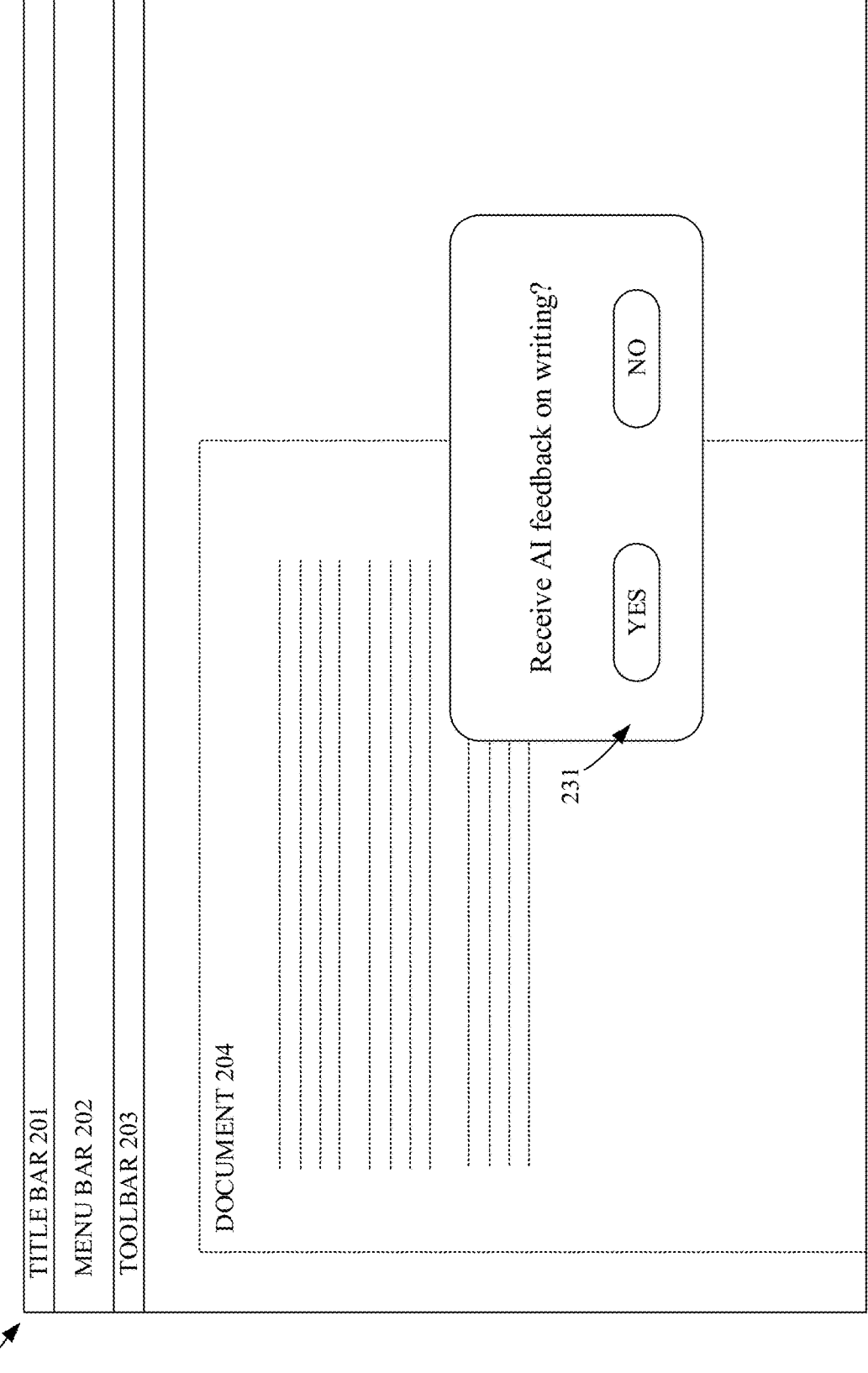
FIGS. 2A and 2B depict examples of user interfaces in which aspects of this disclosure may be implemented.
Figure 2B:
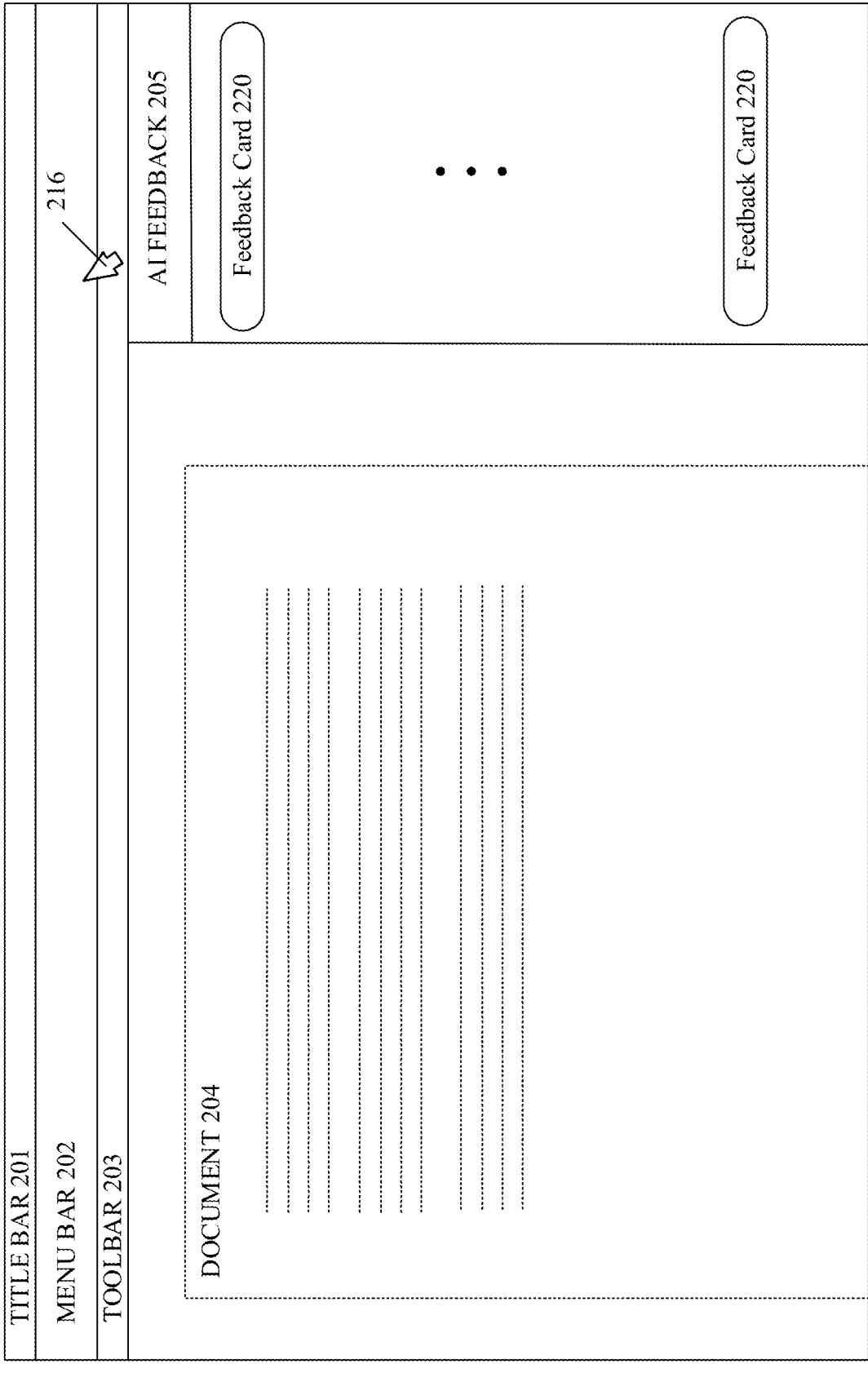

FIGS. 2A and 2B depict examples of user interfaces in which aspects of this disclosure may be implemented. As shown in FIG. 2A, the AI feedback feature being described can be proactive in suggesting to a user that AI feedback on a writing sample could be obtained. For example, the user may be operating an illustrative application that includes the plug-in or add-in described above. The user interface 230 of this application may have, for example, a title bar 201, a menu bar 202 and a toolbar 203. The user interface 230 may also have a window in which a document 204 is being viewed or drafted by the user. As noted above, this application could be any of a wide variety of applications including, but not limited to, a word processing application, an email application, a browser, a collaboration or presentation application and others.

As the user is viewing or drafting the document 204, the illustrative application may provide a pop-up window 231 that invites the user to utilize the AI writing feedback feature. Specifically, this pop-up window 231 could be triggered when the user saves the document, prepares to close the document, pauses in writing the document for a predetermined amount of time or a variety of other events or points in the drafting of the document 204. If the user selects YES, on the pop-up 231, the method of FIG. 1B may be executed. This may include asking the user to designate on which portion or portions of the document 204 to generate feedback or simply using the whole document. If the user is asked to designate what portion of the document to use, the user interface 230 may allow the user to respond and indicate what portion to use. For example, the user could mouse click on or drag the mouse over the portion of the document 204 to be used for soliciting feedback. Thus, the user can select a span of text in the document and request feedback only on that span. If user selects the whole document, a rewrite for the whole document can be generated.

FIG. 2B illustrates, alternatively, that the user may operate a mouse cursor 216 to select from the menu bar 202 or toolbar 203 the option to invoke the AI writing feedback feature. In any case, when the feature is invoked, an AI feedback pane 205 may be opened for the user in the user interface adjacent to the document 204 or elsewhere. As will be described in further detail below, once the AI feedback has been obtained, a number of feedback cards 220 may be displayed in the AI feedback pane 205. The cards 220 may organize the feedback from the AI engine into different categories. The user can then review the category or categories of feedback that are of interest and may implement or discard specific suggestions made by the AI engine. The structure of the query to the AI can be adapted to support receiving feedback for different categories and specific suggestions for improving the text of the document 204. In other examples, the query may indicate categories that are to be avoided when providing feedback. For example, the query may state that no feedback is requested regarding any of the categories discussed herein or others.

FIG. 2C is a flow diagram illustrating an alternative method 160 of obtaining writing feedback according to aspects of this disclosure. As shown in FIG. 2C, the method 160 again begins when the AI writing feedback feature is invoked 151, as described herein. Next, the user may identify 152, in the user interface of the application, what written text is to be reviewed and receive feedback. As noted above, this may be an entire document or just a portion of the document.

Next, AI writing feedback feature, e.g., the plug-in or add-in 116, may determine 161 specific parameters of the document. For example, the plug-in or add-in 116 may identify the document type, document stage, the writer's goal, the target audience or other document parameters. This function may be performed in a variety of ways. For example, the application may use metadata or contextual data of the document to determine some of the document parameters. The application may also call an AI engine to determine these document parameters. This could be the same AI engine that will eventually provide the desired feedback or a different AI engine.

Alternatively, the application could query the user through the user interface to enter the document parameters. Also, if these document parameters are determined automatically, the user may be invited 162 to edit or correct the document parameters. In either case, the user input may be via a dropdown menu of possible document parameters or a data entry field in which the user can enter or correct, in natural language, a document parameter. If any such user input is received to existing document parameters, the document parameters are updated 163 accordingly.

Next, the feedback feature, e.g., provided by the plug-in or add-in 116, will structure 153 a query to the AI engine using the designated written text. This query can be in natural language, given the Natural Language Processing (NLP) capabilities of a GPT or similar AI engine.

However, the query is specifically structured in a technical manner to illicit from the AI engine the helpful writing feedback desired by the user. For example, the query may be structured to include the document parameters described above so that the AI engine can take into account those document parameters when providing the requested feedback.

Once properly structured, the query is submitted to the AI engine to obtain 164 the AI feedback. Once received from the AI engine, the application using the plug-in or add-in 116 will be able to display 155 the feedback and implement the feedback at the user's direction as further described herein.

Figure 3A:
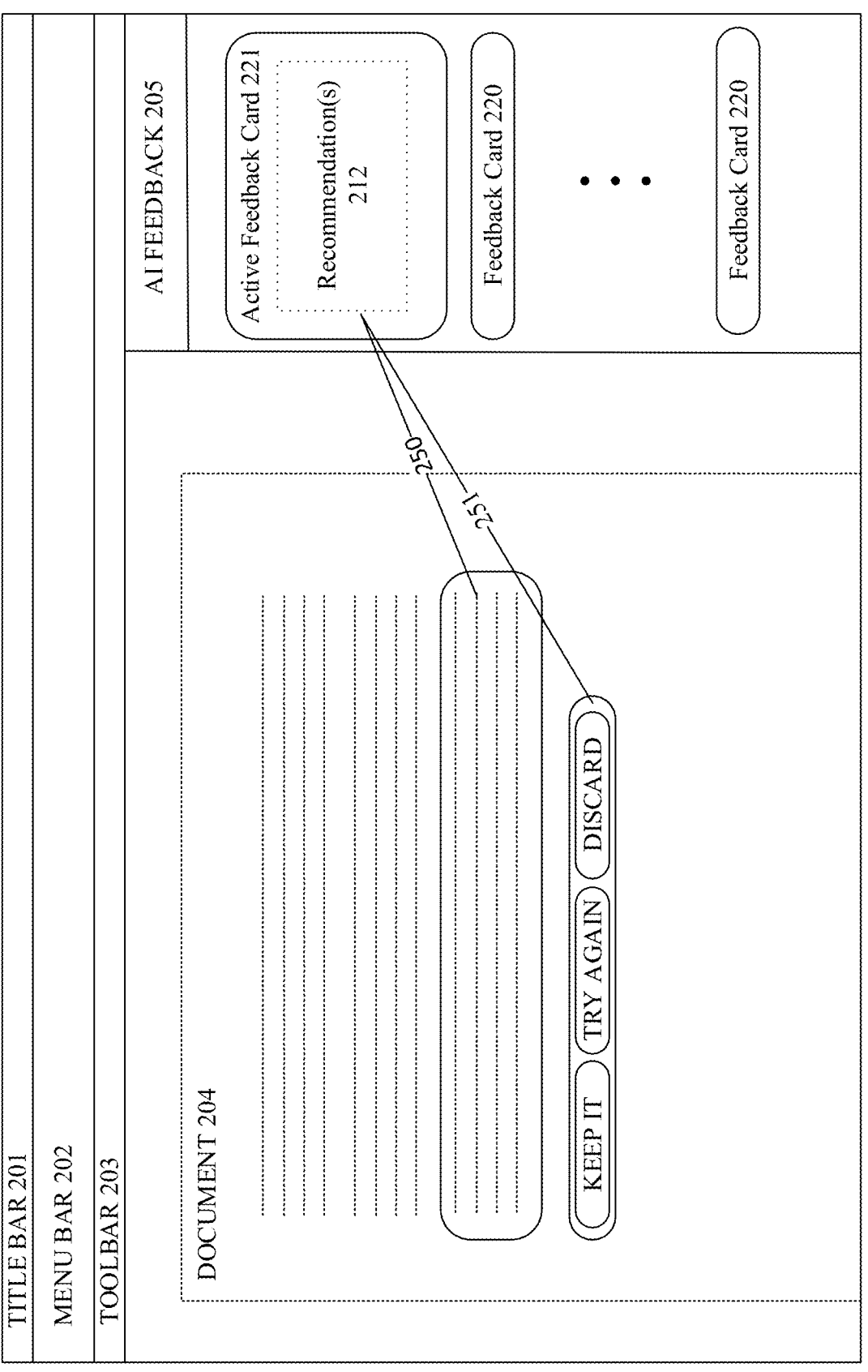
FIGS. 3A-D and 4 depict examples of user interfaces in which aspects of this disclosure may be implemented.
Figure 3B:
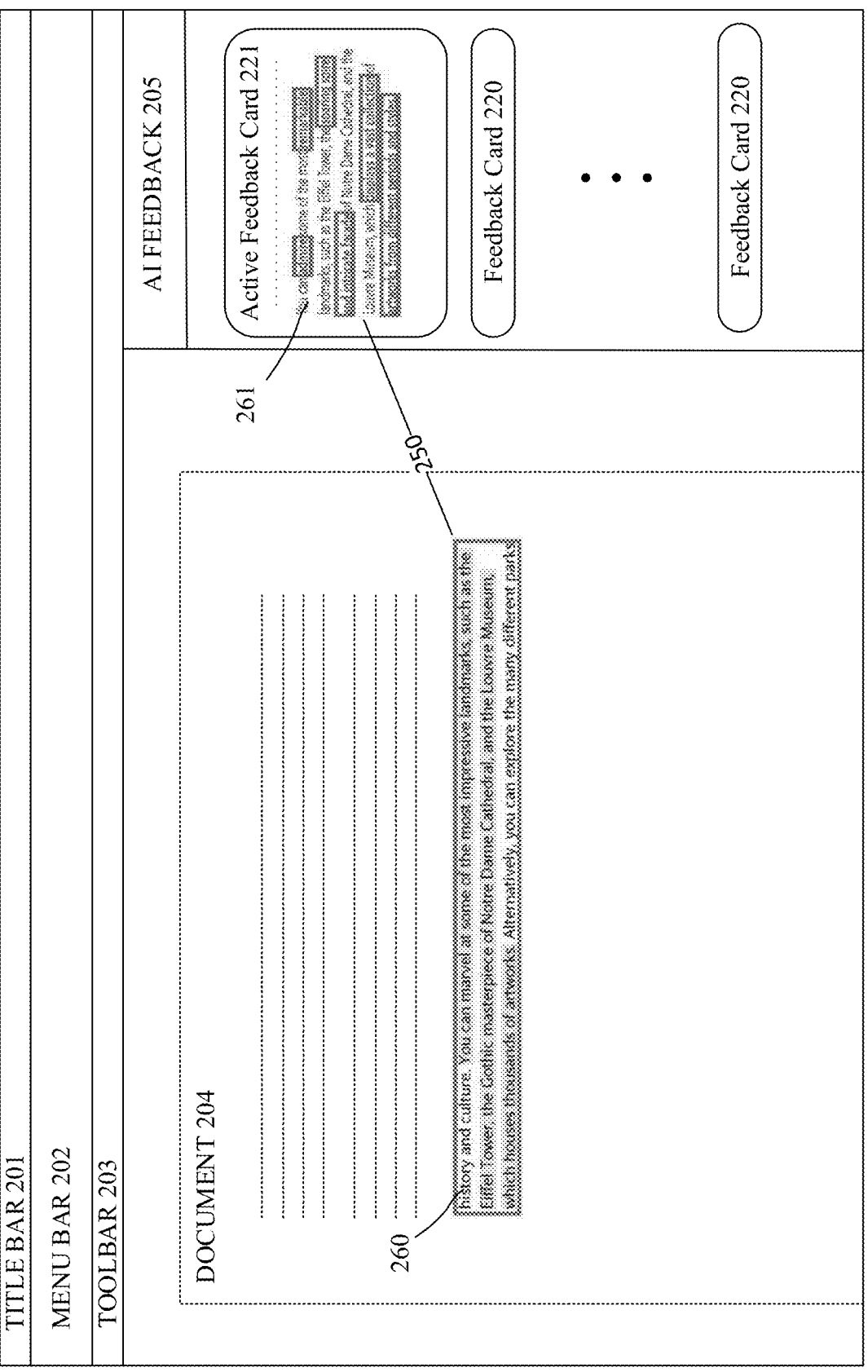
Figure 3C:
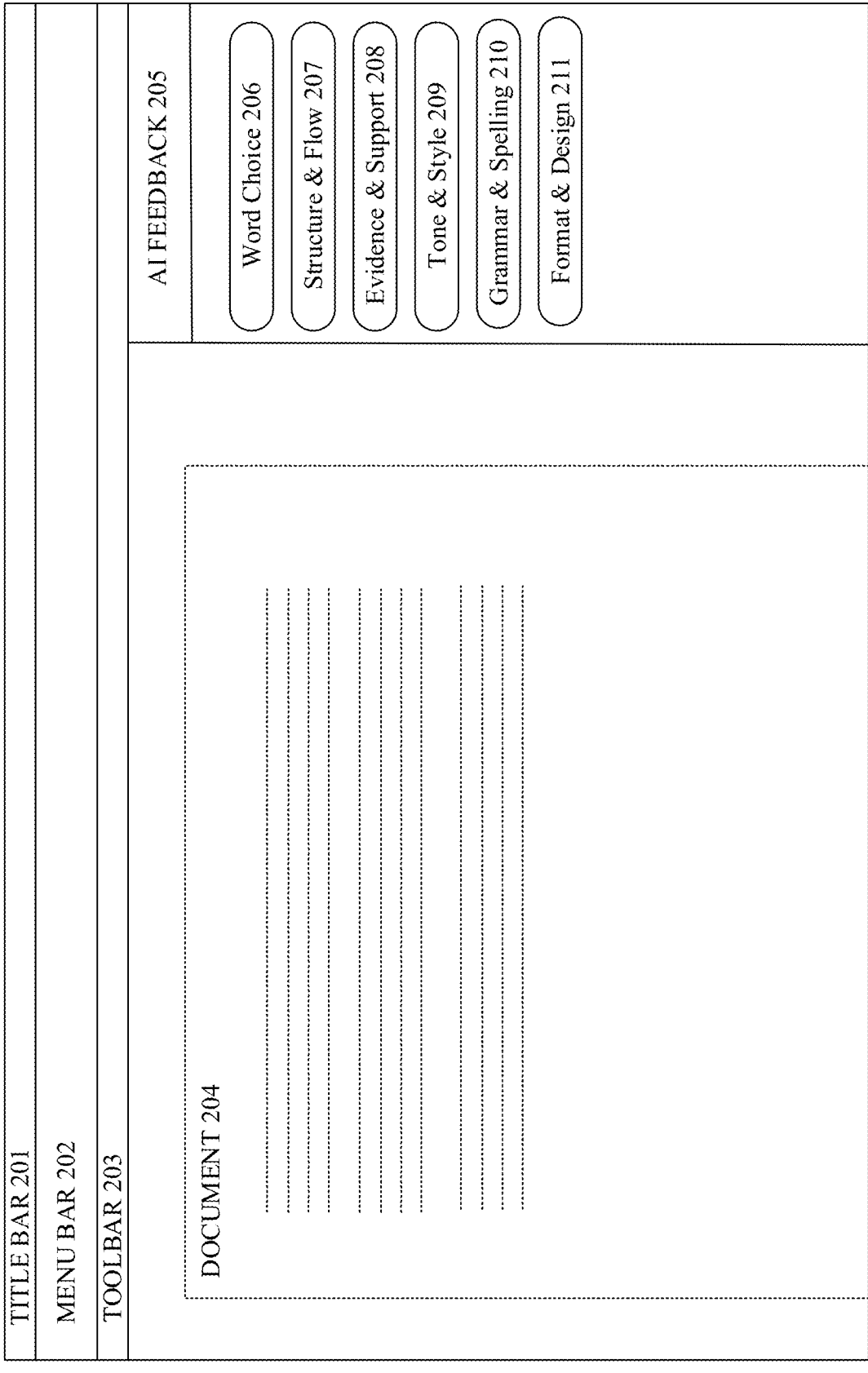

FIG. 3A-C depict examples of user interfaces in which aspects of this disclosure may be implemented. For example, FIG. 3A illustrates a user interface of an application with the AI writing feedback feature described herein. Specifically, FIG. 3A illustrates a point in time after which feedback from the AI engine has been received and is being displayed and potentially implemented by the user.

Specifically, the feedback cards 220, mentioned above, are populated in the AI feedback pane 205. Each card 220 may include a specific recommendation or recommendations 212 provided by the AI engine. As noted above, each card 220 may be devoted to feedback in a specific category or for a specific portion of the document 204. As shown in FIG. 3A, one of the feedback cards may have focus and be the active feedback card 221. In this case, the active card 221 is extended to show the recommendation or recommendations 212 of that card.

As also shown in FIG. 3A, the portion of the document 204 to which the recommendation(s) pertain may be highlighted 250. Within this highlight 250, only the original section of the document may be display or the highlight may include some combination of the original and suggested text from the recommendation(s) 212. The highlight 250 may also be accompanied by a user interface tool 251 that allows the user to respond to the recommendation(s). This tool 251 may also be referred to as a context card displayed over the document canvas. In the illustrated example, the tool 251 includes an option for the user to "keep it" or implement the proposed recommendation. Upon selection of this option, the recommended text is inserted into the document 204 in place of the original text. Consequently, with just a single action, e.g., mouse click or button tap, the user can implement the AI recommendation. The tool 251 also includes an option for the user to "Discard" or reject the recommendation(s) 212. Upon selection of this option, the original text is retained in the document 204 without any change. Lastly, the tool 251 includes an option to "Try Again." Upon selection of this option, the AI engine is queried for an alternative recommendation on the indicated text. This may mean that the relevant elements of the method in FIG. 1B or 2C are iterated to produce the alternative recommendation. Thus, the user can refine feedback iteratively by asking for alternative feedback on the same topic and alternative examples and rewrites.

It should be noted that the recommendations 212 might also include adding or inserting elements that were not in the document 204. For example, the feedback card 221 may include a recommendation to add a particular title. In such an example, the "keep it" button may instruct the system to accept a new insertion to the document 204 rather than rewrite or replace an existing word, phrase or larger text block. The user interface shown in FIG. 3A can be adapted to any such scenario. For example, the first button may read "INSERT?" in such a case, rather than "KEEP IT." The button might also be labeled with "REPLACE," "REWRITE," "SWAP" or any other command term appropriate to the recommendation being offered.

FIG. 3B illustrates another example similar to FIG. 3A. As shown in FIG. 3B, corresponding highlight elements may be used in the recommendations of the active card 221 and the document canvas 204 to help the user appreciate the changes that have been recommended. For example, in the recommendation 261, specific words or phrases that have been changes are highlighted with an accent box and a differently color font. This recommendation card 221 is associated visually 250 with a corresponding highlighted section 260 on the document canvas. This highlight 260 may be include accent box also and the text being edited being highlighted with a background color in the accent box. In such an example, the user interface may allow the user to consider each changes word or phrase and, as above, implement or discard the proposed change, or request another suggestion from the AI engine.

FIG. 3C illustrates another possible user interface of an application with the AI writing feedback feature described herein. In particular, FIG. 3C illustrates the feedback received from the AI engine being divided into illustrative categories that are represented by respective cards in the AI feedback pane 205. Specifically, as shown in FIG. 3C, categories and corresponding cards may include: word choice 206, structure & flow 207, evidence and support 208, tone & style 209, grammar & spelling 210, and format & design 211.

Figure 3D:
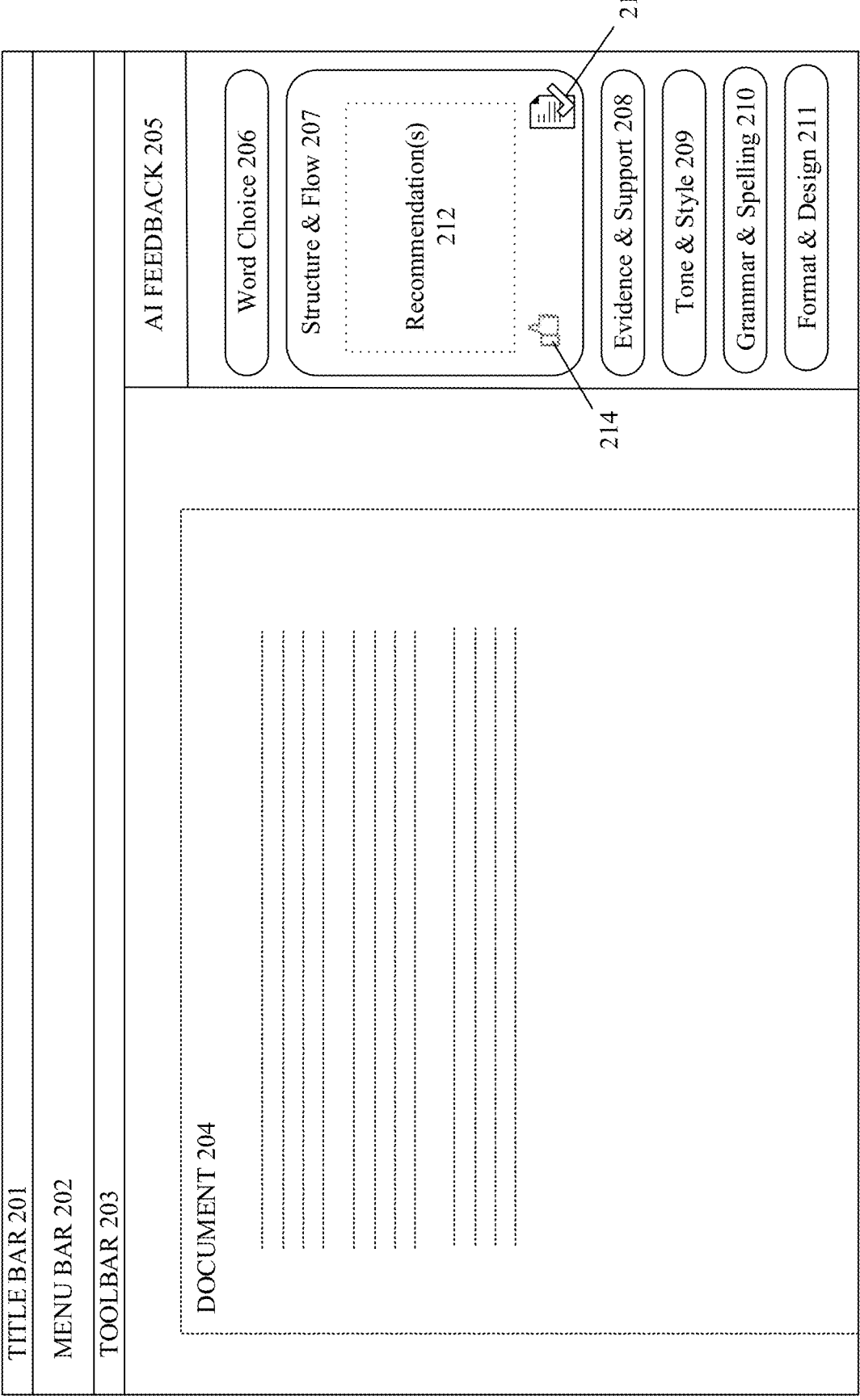

As shown in FIG. 3D, one of these cards may be selected in the user interface as the focus. In FIG. 3D, this is the card 207 for "Structure & Flow" 207. As before, selecting this card will display the recommendation(s) for this category that have been returned by the AI engine. Focusing the card 207 could produce the same card or user interface tool on the document canvas as illustrated in FIG. 3C. Alternatively, the card 207 may include an icon 213 to implement the recommendation(s) 212. This could be an icon to simply implement all the recommendations in the card 207 or could be a series of icons to individually implement each recommendation made. Either the user interface tool of FIG. 3C or the focused card of FIG. 3D may include an icon or icons 214 with which a user can give feedback on the quality of the recommendation(s) 212. If the user indicates disapproval of the recommendation(s), this feedback may be used to fine-tune the training of the AI engine being used.

Figure 4:
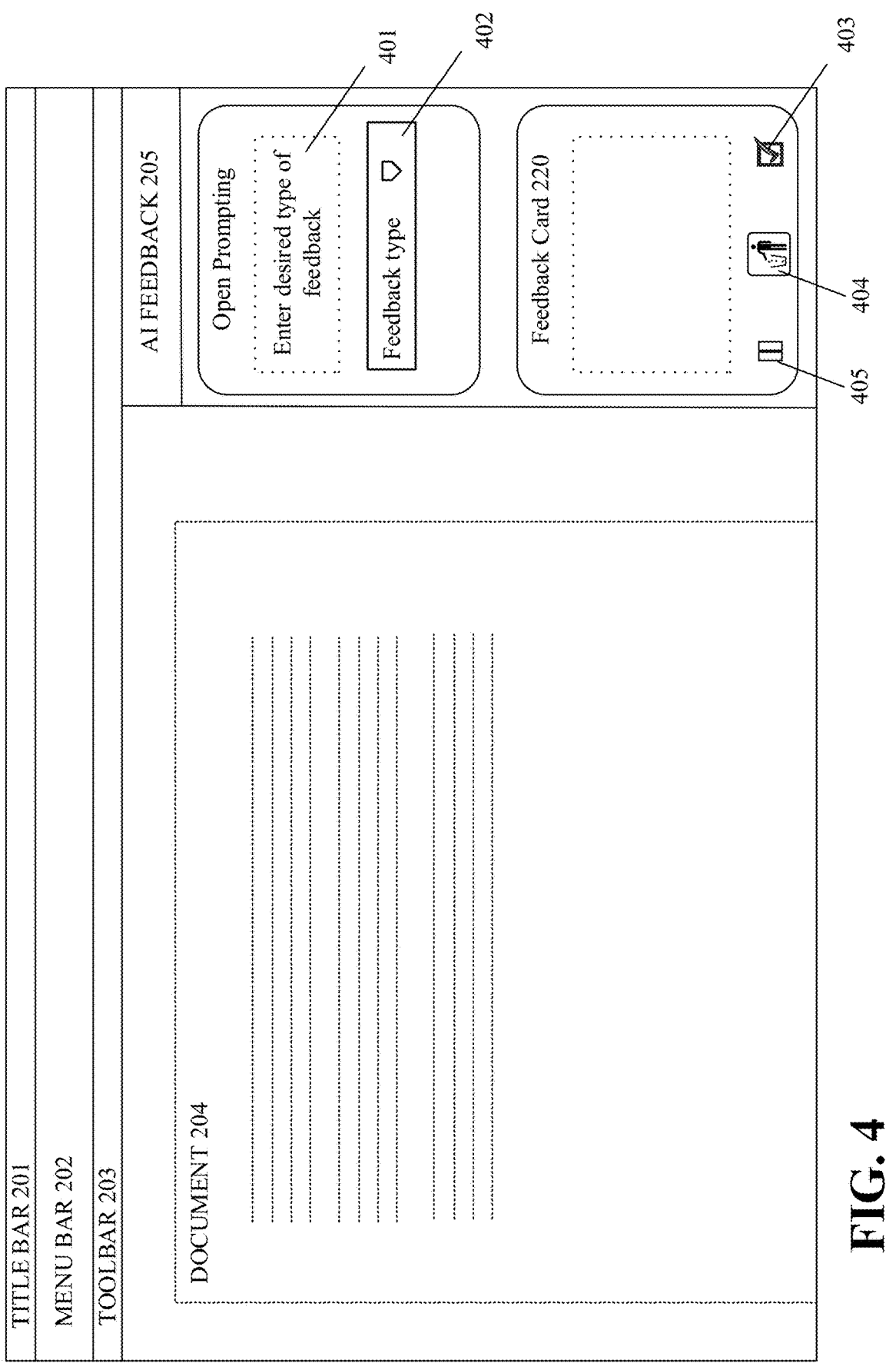

A number of additional options could be incorporated into any of the preceding examples of user interfaces for the AI writing feedback application feature. Some of these options are illustrated in FIG. 4. (1) Open prompting: in this option, the user interface of the AI feedback pane or other interface element of the application allows the user to query the AI engine directly for specific type of feedback. The application will receive the user's specification of the type of feedback desired and structure the query to the AI engine to request that specific type of feedback in response to the user's input. As shown in FIG. 4, this could include a text entry field 401 in which the user can enter the desired type of feedback. Thus, the user can make a custom query to the AI engine through a textbox to get specific type of feedback. This could also include a dropdown menu 402 with a list of possible types of feedback from which the user can select. For example, the user may the system to provide sample questions that future readers of this document might ask. For example, In this case the user could ask: "what might my reader be asking about this content?" The user may also, in making such an inquiry, specify further conditions, such as specifying the audience for which the document is intended as a factor to be considered in answering what questions that target audience might ask about the content. The user may also operate the user interface 401 or a similar interface feature to specify a separate document or resource that is relevant to the content of the document 204 and should be processed by the AI engine when producing feedback for the document 204. For example, the user might specify the related document or resource and, with the prompting interface 401, ask that the feedback indicate where the document 204 might be inconsistent with the specified document or resource.

(2) Multi-turn: in this option, the user interface for the AI feedback pane or other interface element of the application allows the user to request the AI engine to refine its feedback (e.g. "give me more examples" or "could it be rewritten in this other way?"). An example of this is the "Try again" option in FIG. 3A.

(3) Triaging the feedback cards: in this option, the user interface for the AI feedback pane or other interface element of the application allows the user to mark the feedback cards that have been reviewed, mark others for later review, delete others, etc. As shown in FIG. 4, a feedback card 220 may include icons for marking the card as reviewed 403, for holding the card for later review 405 or deleting the card 404. These features may help the user manage feedback cards more effectively, particularly when there is a large number of feedback cards, perhaps for a relatively long writing sample. Lastly, the system described herein may use rules and knowledge base fact checking to suppress irrelevant or erroneous feedback or recommended changes that might be generated by the AI engine.

Figure 5:
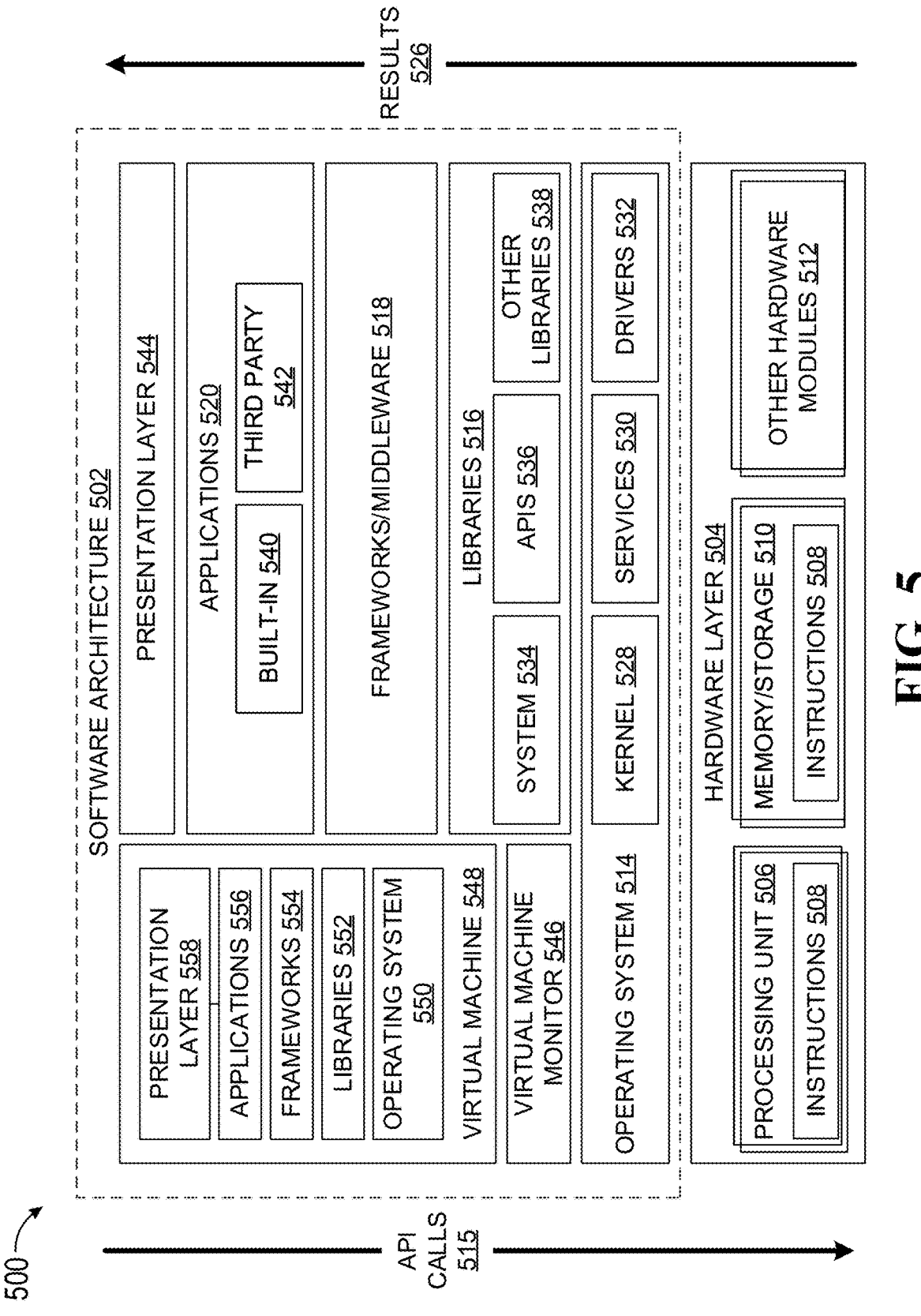
FIG. 5 is a block diagram illustrating an example software architecture, various portions of which may be used in conjunction with various hardware architectures herein described.

FIG. 5 is a block diagram 500 illustrating an example software architecture 502. This software architecture can be part of a system, as described, herein for an application with an AI writing feedback feature as described above. Various portions of this illustrated software architecture may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 515 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
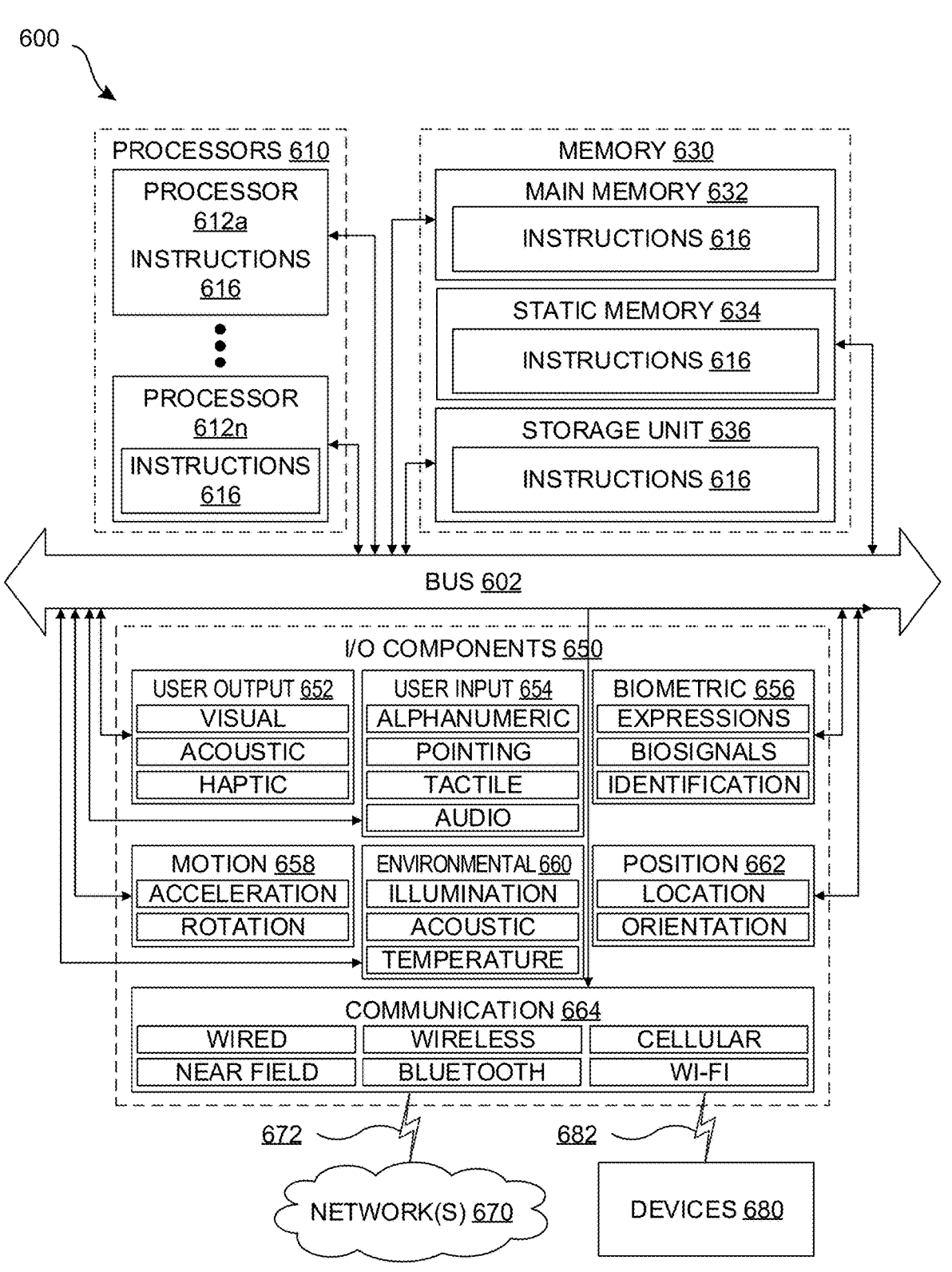
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. This example machine can be part of a system, as described, herein for supporting a user device with an application having the AI writing feedback feature described above. Alternatively, the machine in FIG. 6 may describe a server for supporting an AI engine as described herein.

The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electro-magnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:

a processor;

a memory containing programming instructions for execution by the processor; and a network interface for communicating with an Artificial Intelligence (AI) engine;

the programming instructions comprising an application for generating written content, the application having a function to generate and submit a structured query regarding the written content to the AI engine to generate feedback on an assessed quality of the written content, the structured query structured to prompt for feedback in a variety of categories for the written content;

the application further comprising a user interface to display the feedback on the written content and provide an option to a user to implement the feedback to revise the written content.

Item 2. The data processing system of Item 1, wherein the programming instructions comprise an add-in or plug-in comprising the function to generate and submit the structured query.

Item 3. The data processing system of Item 1, wherein a structure of the query specifies categories of feedback to be returned by the AI engine.

Item 4. The data processing system of Item 1, wherein a structure of the query specifies a prompt to critique the written content and, for each critique, to provide (1) a title, (2) a description of the critique (2a) respecting a specific tone and (2b) respecting a specific format, (3) an example of the critique in the document and (4) a suggested rewrite.

Item 5. The data processing system of Item 1, wherein the user interface comprises a prompt to the user to invoke the function to generate feedback on an assessed quality of the written content.

Item 6. The data processing system of Item 1, wherein the user interface comprises a tool for designating a portion of the written content on which to generate the feedback.

Item 7. The data processing system of Item 1, wherein the user interface divides the feedback from the AI engine among a plurality of cards.

Item 8. The data processing system of Item 1, wherein the feedback based on the structure of the query comprises at least one rewritten portion of the written content, the user interface further comprising an option to automatically replace an original portion of the written content with the rewritten portion from the feedback.

Item 9. The data processing system of Item 1, wherein the application is to determine a number of document parameters relevant to the written content, the document parameters being incorporated into the structured query by the application.

Item 10. The data processing system of Item 9, wherein the user interface comprises a tool for the user to enter or adjust the document parameters.

Item 11. The data processing system of Item 1, wherein the user interface further comprises a tool that interacts on a canvas of the written content to highlight text for which feedback has been received based on the structured query, the tool comprising options to implement or discard the feedback on the highlighted text.

Item 12. The data processing system of Item 1, wherein feedback comprises a number of recommendations for editing the written content, the user interface further comprising an option to request that an additional query be sent to the AI engine for an alternative to any of the number of recommendations.

Item 13. The data processing system of Item 1, wherein the user interface comprises options for rating a recommendation on the written content contained in the feedback from the AI engine.

Item 14. A non-transitory computer-readable medium comprising programming instructions that, when executed by a processor, cause the processor to:

generate a structured query for an Artificial Intelligence (AI) engine regarding designated written content, the structured query to the AI engine to generate feedback on an assessed quality of the written content;

submit the query to the AI engine via a network interface;

receive the feedback on the written content from the AI engine via the network interface; and invoke a user interface to display the feedback on the written content and provide an option to a user to implement the feedback to revise the written content.

Item 15. The non-transitory computer-readable medium of Item 14, wherein the programming instructions comprise an add-in or plug-in for an application, the add-in or plug-in comprising the function to generate and submit the structured query.

Item 16. The non-transitory computer-readable medium of Item 14, wherein a structure of the query specifies a prompt to critique the written content and, for each critique, to provide (1) a title, (2) a description of the critique (2a) respecting a specific tone and (2b) respecting a specific format, (3) an example of the critique in the document and (4) a suggested rewrite.

Item 17. The non-transitory computer-readable medium of Item 14, wherein the feedback based on the structure of the query comprises at least one rewritten portion of the written content, the user interface further comprising an option to automatically replace an original portion of the written content with the rewritten portion from the feedback.

Item 18. A computer-implemented method of providing technical writing assistance to a user operating an application to generate written content by providing feedback on the written content from an Artificial Intelligence (AI) engine, the method comprising:

generating a structured query for the AI engine regarding the written content, the structured query to the AI engine to generate feedback on an assessed quality of the written content;

submitting the query to the AI engine via a network interface;

receiving the feedback on the written content from the AI engine via the network interface; and invoking a user interface to display the feedback on the written content and provide an option to a user to implement the feedback to revise the written content.

Item 19. The method of Item 18, further comprising augmenting the application with an add-in or plug-in comprising programming for generating and submitting the structured query.

Item 20. The method of Item 14, wherein the structured query is in Natural Language and a structure of the query specifies a prompt to critique the written content and, for each critique, to provide (1) a title, (2) a description of the critique (2a) respecting a specific tone and (2b) respecting a specific format, (3) an example of the critique in the document and (4) a suggested rewrite.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a memory storing executable instructions that, when executed, cause the processor alone or in combination with other processors to perform operations of:

implementing an application having a user interface allowing a user to operate tools for generating written content, the application further including a function to generate and submit a query regarding the written content to an Artificial Intelligence engine to generate feedback on an assessed quality of the written content;

determining in the application a number of document parameters relevant to the written content;

incorporating the number of document parameters into the query and, with the application, structuring the query to prompt the Artificial Intelligence engine to provide feedback in a variety of specified categories of assessed quality of the written content, the feedback comprising a number of recommendations for editing the written content;

displaying the feedback on the assessed quality of the written content with a user interface of the application, the user interface further comprising a tool for receiving user input to revise the written content based on the feedback; and utilizing the user input to implement the feedback to revise the written content.

2. The data processing system of claim 1, wherein the tools comprise a control to resubmit the query to the Artificial Intelligence engine to regenerate the feedback in a new iteration.

3. The data processing system of claim 2, wherein the control to resubmit the query, when selected, causes the query to be regenerated to as to produce alternative feedback from the Artificial Intelligence engine.

4. The data processing system of claim 1, wherein the user interface comprises a feedback card in which a set of specific recommended changes to the written content are visually highlighted.

5. The data processing system of claim 4, wherein the feedback card contains the written content, as originally used for the query, with the set of specific recommended changes indicated within a display of the written content.

6. The data processing system of claim 4, further comprising a visual element connecting display of the set of specific recommended changes with a corresponding portion of the written content in a display of the written content in the application.

7. The data processing system of claim 1, wherein the feedback is divided into a plurality of categories and the tools comprise controls for accessing feedback for each of the plurality of categories.

8. The data processing system of claim 7, wherein the plurality of categories comprises at least one of word choice, structure & flow, evidence & support, tone & style, grammar & spelling, and format & design.

9. The data processing system of claim 7, wherein the user interface comprises a card for each of the plurality of categories and, upon selection of a card, a set of recommendations in a corresponding category of the feedback are presented.

10. The data processing system of claim 9, wherein the card for each of the plurality of categories further comprises a control to implement the set of recommendations in the corresponding category of the feedback.

11. The data processing system of claim 9, wherein the card for each of the plurality of categories further comprises a control to receive user approval of the set of recommendations in the corresponding category of the feedback.

12. The data processing system of claim 1, wherein the tools comprise a field for user input specifying a type of feedback desired on the written content, wherein the user input is incorporated into a query to the Artificial Intelligence engine.

13. The data processing system of claim 1, wherein the tools comprise a menu listing different types of feedback to be made on the written content, and, upon selection of a listing from the menu, a query is made to the Artificial Intelligence engine requesting a selected type of feedback on the written content corresponding to the listing selected from the menu.

14. A method comprising:
 implementing an application having a user interface allowing a user to operate tools for generating written content, the application further including a function to generate and submit a query regarding the written content to an Artificial Intelligence engine to generate feedback on an assessed quality of the written content;
 determining in the application a number of document parameters relevant to the written content;
 incorporating the number of document parameters into the query and, with the application, structuring the query to prompt the Artificial Intelligence engine to provide feedback in a variety of specified categories of assessed quality of the written content, the feedback comprising a number of recommendations for editing the written content;
 displaying the feedback on the assessed quality of the written content with a user interface of the application, the user interface further comprising a tool for receiving user input to revise the written content based on the feedback; and
 utilizing the user input to implement the feedback to revise the written content.

15. The method of claim 14, wherein the tools comprise a control to resubmit the query to the Artificial Intelligence engine to regenerate the feedback in a new iteration.

16. The method of claim 14, wherein:
 the user interface comprises a feedback card in which a set of specific recommended changes to the written content are visually highlighted;
 the feedback card contains the written content, as originally used for the query, with the set of specific recommended changes indicated within a display of the written content.

17. The method of claim 14, wherein the feedback is divided into a plurality of categories and the tools comprise controls for accessing feedback for each of the plurality of categories.

18. A non-transitory computer-readable medium comprising programming instructions for an application, when executed by a processor, alone or in conjunction with other processors, the application performing operations of:
 implementing an application having a user interface allowing a user to operate tools for generating written content, the application further including a function to generate and submit a query regarding the written content to an Artificial Intelligence engine to generate feedback on an assessed quality of the written content;
 determining in the application a number of document parameters relevant to the written content;
 incorporating the number of document parameters into the query and, with the application, structuring the query to prompt the Artificial Intelligence engine to provide feedback in a variety of specified categories of assessed quality of the written content, the feedback comprising a number of recommendations for editing the written content;
 displaying the feedback on the assessed quality of the written content with a user interface of the application, the user interface further comprising a tool for receiving user input to revise the written content based on the feedback; and
 utilizing the user input to implement the feedback to revise the written content.

19. The non-transitory computer-readable medium of claim 18, wherein the tools comprise a menu listing different types of feedback to be made on the written content, and, upon selection of a listing from the menu, a query is made to the Artificial Intelligence engine requesting a selected type of feedback on the written content corresponding to the listing selected from the menu.

20. The non-transitory computer-readable medium of claim 18, wherein the user interface comprises a feedback card in which a set of specific recommended changes to the written content are visually highlighted, wherein the feedback card contains the written content, as originally used for the query, with the set of specific recommended changes indicated within a display of the written content.

21. The non-transitory computer-readable medium of claim 18, wherein structuring the query comprises preparing a query with a structure that includes a prompt to critique the written content and a specified format for the critique.

* * * * *